United States Patent
McMullen

(10) Patent No.: US 11,451,441 B2
(45) Date of Patent: Sep. 20, 2022

(54) MANAGEMENT OF EDGE DICTIONARY CONTAINERS IN CONTENT NODES OF A CONTENT DELIVERY NETWORK

(71) Applicant: Fastly, Inc., San Francisco, CA (US)

(72) Inventor: Tyler B. McMullen, San Francisco, CA (US)

(73) Assignee: Fastly, Inc., San Francisco, CA (US)

( * ) Notice: Subject to any disclaimer, the term of this patent is extended or adjusted under 35 U.S.C. 154(b) by 1656 days.

(21) Appl. No.: 15/402,875

(22) Filed: Jan. 10, 2017

(65) Prior Publication Data
US 2017/0201416 A1 Jul. 13, 2017

Related U.S. Application Data

(60) Provisional application No. 62/277,544, filed on Jan. 12, 2016.

(51) Int. Cl.
| | | |
|---|---|---|
| *G06F 16/30* | (2019.01) | |
| *H04L 41/082* | (2022.01) | |
| *H04L 67/10* | (2022.01) | |
| *H04L 67/02* | (2022.01) | |
| *H04L 67/1097* | (2022.01) | |
| *H04L 67/563* | (2022.01) | |
| *H04L 67/568* | (2022.01) | |
| *H04L 41/0266* | (2022.01) | |

(52) U.S. Cl.
CPC ........... *H04L 41/082* (2013.01); *H04L 67/02* (2013.01); *H04L 67/10* (2013.01); *H04L 67/1097* (2013.01); *H04L 67/563* (2022.05); *H04L 67/568* (2022.05); *H04L 41/0266* (2013.01)

(58) Field of Classification Search
CPC .... G06F 16/258; G06F 16/252; G06F 16/254; G06F 16/16; G06F 16/23
USPC ........ 707/609, 687, 705, 769, 790, 813, 821
See application file for complete search history.

(56) References Cited

U.S. PATENT DOCUMENTS

| | | | | |
|---|---|---|---|---|
| 6,026,474 | A * | 2/2000 | Carter | G06F 12/0813 |
| | | | | 711/E12.066 |
| 7,770,122 | B1* | 8/2010 | Shaik | G06F 16/958 |
| | | | | 715/744 |
| 2008/0126531 | A1 | 5/2008 | Setia et al. | |
| 2011/0246503 | A1* | 10/2011 | Bender | G06F 16/258 |
| | | | | 707/769 |
| 2011/0252192 | A1* | 10/2011 | Busch | G06F 16/23 |
| | | | | 711/E12.016 |
| 2014/0189859 | A1* | 7/2014 | Ramanan | G06F 21/56 |
| | | | | 726/22 |
| 2015/0026315 | A1* | 1/2015 | Bergman | H04L 41/0803 |
| | | | | 709/220 |

(Continued)

*Primary Examiner* — Sana A Al-Hashemi

(57) ABSTRACT

Described herein are enhancements for operating content nodes in a content delivery network. In at least one implementation, a content node deploys a request handler configuration and a key-value object, wherein the key-value object includes one or more key-value pairs and wherein the request handler configuration calls, in response to a content request from an end user device, the key-value object using a key associated with the content request and the key-value object returns a value associated with the key. The content node further obtains a request to modify the key-value object, identifies a modification to the key-value object based on the command, and updates the key-value object with the modification.

20 Claims, 5 Drawing Sheets

(56) References Cited

U.S. PATENT DOCUMENTS

2016/0103845 A1\* 4/2016 Yeddanapudi ........ G06F 16/116
                                                     707/756
2016/0241528 A1\* 8/2016 Kulkarni ............ H04L 67/2842

\* cited by examiner

MANAGEMENT OF EDGE DICTIONARY CONTAINERS IN CONTENT NODES OF A CONTENT DELIVERY NETWORK

RELATED APPLICATIONS

This application hereby claims the benefit of and priority to U.S. Provisional Patent Application No. 62/277,544, titled "MANAGEMENT OF EDGE DICTIONARY CONTAINERS IN CONTENT NODES OF A CONTENT DELIVERY NETWORK," filed Jan. 12, 2016, which is hereby incorporated by reference in its entirety.

TECHNICAL BACKGROUND

Network-provided content, such as Internet web pages or media content such as video, pictures, music, and the like, are typically served to end users via networked computer systems. End user requests for the network content are processed and the content is responsively provided over various network links. These networked computer systems can include hosting servers, which host network content of content creators or originators, such as web servers for hosting a news website. However, these originating computer systems can become overloaded and slow due to frequent requests of content by end users.

To assist the origin servers, content delivery networks have been developed that create a layer of caching between the origin servers and the end users. These content delivery networks typically have one or more content nodes, or cache nodes, distributed across a large geographic region to provide faster and lower latency access to the content for the end users. In operation, content from the origin servers can be cached into the content nodes, and can be requested via the content nodes from the origin server when the content has not yet been cached. Content nodes usually cache only a portion of the original source content rather than caching all content or data associated with an original content source. As such, content may need to be deleted or purged from the system based on updating the content, an administrator request to remove content from the nodes, a lack of use of the content, or for any other purpose.

In some implementations, content nodes may include configuration services that are used to manage requests from end user devices. These configuration services often include varnish configuration language (VCL) services and other similar services that are designed to be used to define request handling and document caching policies for content to be supplied to requesting end user devices. Although configuration services may assist in managing content requests, the configurations may be cumbersome and include various if-then statements that are difficult to modify and cause unnecessary delay in content requests.

Overview

Described herein are enhancements for limiting recompiling of request handler configurations based on updates to the configurations. In one implementation, a method of managing key-value objects in a content node of a content delivery network includes deploying a request handler configuration and a key-value object, wherein the key-value object includes one or more key-value pairs and wherein the request handler configuration calls, in response to a content request from an end user device, the key-value object using a key associated with the content request and the key-value object returns a value associated with the key. The method further provides obtaining a command to modify the key-value object and, in response to the command, identifying a modification to the key-value object based on the command. Once the modification is identified, the method includes updating the key-value object with the modification.

In some implementations, the request handler configuration may comprise a Varnish configuration language (VCL) configuration.

BRIEF DESCRIPTION OF THE DRAWINGS

The following description and associated figures teach the best mode of the invention. For the purpose of teaching inventive principles, some conventional aspects of the best mode can be simplified or omitted. The following claims specify the scope of the invention. Note that some aspects of the best mode cannot fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

DESCRIPTION

Figure 1:
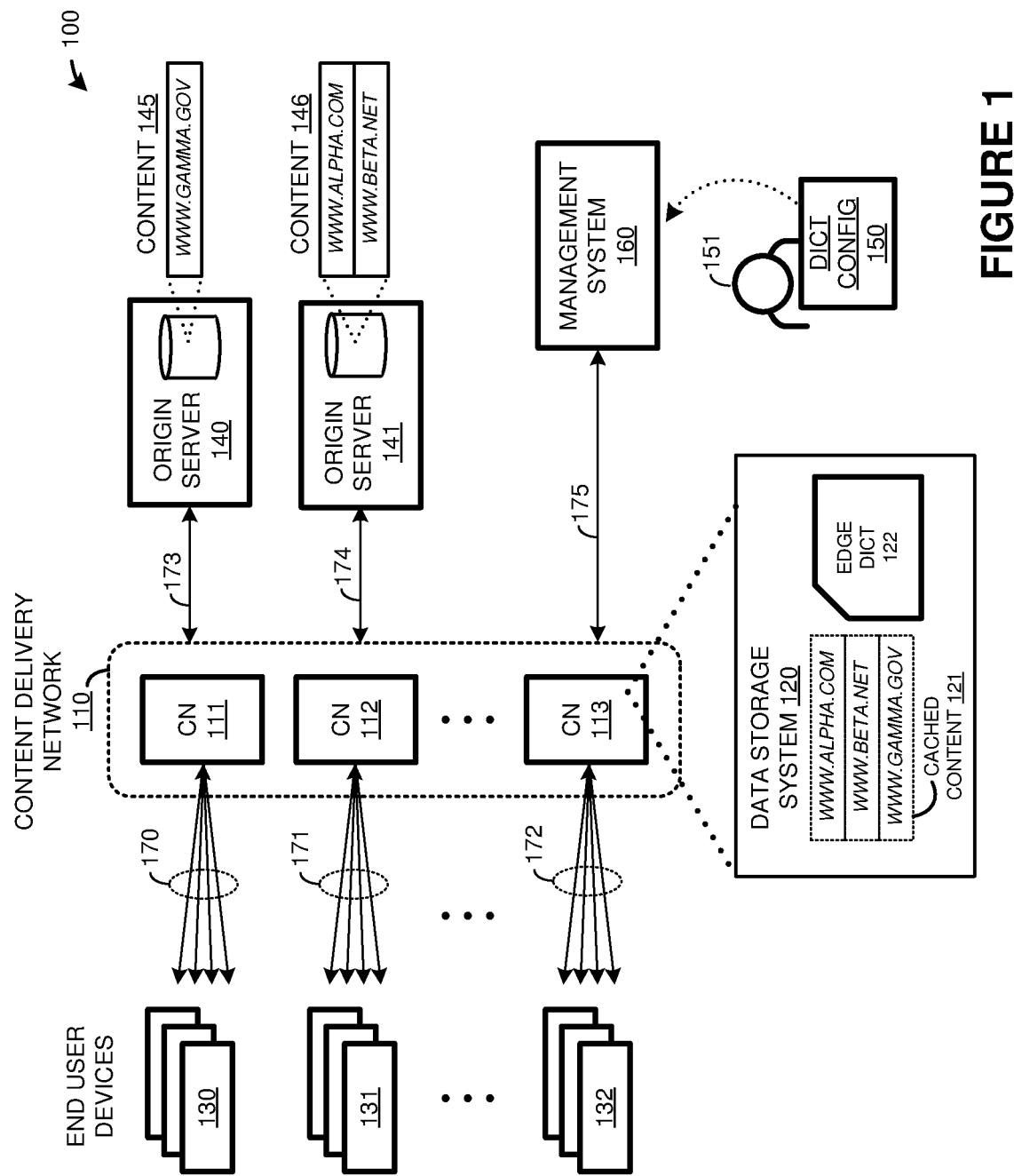
FIG. 1 illustrates a communication network to provide content to end user devices via content nodes according to an implementation.

Network content, such as web page content, typically includes content such as text, hypertext markup language (HTML) pages, pictures, video, audio, animations, code, scripts, or other content viewable by an end user in a browser or other application. This various network content can be stored and served by origin servers and equipment. However, when a content delivery network is employed, the content delivery network can act as a proxy to cache content delivery between origin servers and the end user devices.

Content delivery networks can add a layer of caching between origin servers of the content providers and the end users. The content delivery networks typically have one or more content nodes (CNs), or cache nodes, distributed across a large geographic region to provide faster and lower latency local access to the content for the end users. When end users request content, such as a web page, a locally proximate content node will respond to the content request instead of the associated origin server. Various techniques can be employed to ensure the content node responds to content requests instead of the origin servers, such as associating web content of the origin servers with network addresses of the content nodes.

In many examples of a CN, multiple network content sources are handled by a single CN. For example, a CN can be configured to cache website content of many different websites of many different website content originators (sometimes referred to as tenants). A CN may further only cache portions of the original content source to provide the most frequently accessed content to the end user devices. As a result, content and data objects that are stored on the content node may need to be purged and updated to reflect changes in the source content, changes in the requests from the end user devices, or for a variety of other purposes.

In some implementations, Varnish Configuration Language (VCL) and other request handling languages may be employed by the content delivery network, wherein VCL influences how requests are handled and how responses are given to content requests from end user devices. VCL files are organized into subroutines that are executed at different times. For example, one VCL file may be executed when a request is received, and another when files are fetched from the backend server. These VCL files often include a plurality of if-then statements that are used to implement administrator defined rules for various content requests.

Here, in addition to VCL or other similar configuration files that are executed by the individual CNs of the content delivery networks, each of the CNs are further provided with key-value objects, herein referred to as edge dictionaries. These edge dictionaries include functions with key-value pairs that can be referenced by the VCL operations (or other request handler configurations) to more efficiently determine conditions within a data request. For example, rather than using if-then statements to define rules for geoIP redirects to various versions of a webpage, a VCL may be configured to call an edge dictionary object to determine an appropriate domain for a request. In particular, the VCL file may include a function that calls the edge dictionary container. Once called, the edge dictionary container may use the configured key-value pairs to determine the appropriate version of the webpage based on information or a "key" in the included request. The determined value may then be used by the VCL in providing the requested content to the end user device.

To further illustrate the example provided above, a sample edge dictionary is provided below that can be used to determine geoIP redirects for a particular service.

```
table geoip_redirect {
  "GB" : "www.example.co.uk",
  "IE" : "www.example.co.uk",
  "IT" : "www.example.com.it",
  "AU" : "www.example.com.au",
}
```

Here, the table includes four key-value pairs, wherein each pair includes a country code associated with the internet protocol (IP) address of the requesting end user, and an associated webpage for content associated with the IP address. Accordingly, when a request is generated from an IP address associated with the country code or "key" for GB, VCL may use the geoip_redirect table to determine that the request should be directed to www.example.co.uk. Once determined, the content associated with the particular webpage may be provided using content either cached in the CN, or retrieved from the origin associated with the particular webpage.

In some implementations, to configure the edge dictionaries for the CNs of the content delivery network, an administrator of a particular service or website may be provided with an application program interface (API) that can be used to create, delete and modify dictionaries in the content delivery network. In particular, the administrators may use the API to adjust the content of the edge dictionary containers that are used to provide content associated with their service to requesting end user devices. Accordingly, rather than updating an entire VCL file to accommodate a single change to the configuration, the administrator may generate a command for the modification, which in turn may be applied to the dictionary within the content delivery network. This increases the efficiency of updating the files, as a new VCL configuration is not required to be generated for each modification. Rather, an edge dictionary object may add, delete, or replace key-value pairs to support the requested update or modification.

As an illustrative example, using the geoIP redirect table from above, an administrator associated with the service may desire to implement a new key-value pair for a new country code that would access the service. For instance, the administrator may add a new code directing future requests from New Zealand IP addresses to be directed to the Australian domain using the following, or some other similar, API command:

```
curl -XPOST -H 'CDNProvider-Key: <API_key>'
"https://api.CDNProvider.com/service/<service_id>/dictionary/<dictionary_id>/item?item_k
ey=NZ&item_value=www.example.com.au
```

As a result of the command, a new entry in the table will be created permitting the VCL files of the content nodes to direct future New Zealand requests to the Australian domain.

Although illustrated in the previous example as adding a new entry to the dictionary, it should be understood that similar API commands may be used by an administrator of the service to delete or modify previously existing dictionary entries. Further, commands may also exist to generate new dictionaries and delete obsolete dictionaries from being applied by the content delivery network. For example, if a new dictionary is required, the administrator may generate the API command for the new dictionary to be generated, and may subsequently link the new dictionary to the required VCL configuration service to make the dictionary active within the content delivery network. This linking of the dictionary to the service permits the service to call on the dictionary to make determinations using the key-value pairs provided by an administrator.

FIG. 1 illustrates a communication network 100 to provide content to end user devices via content nodes according to an implementation. Communication system 100 includes content delivery network 110, end user devices 130-132, origin servers 140-141, and management system 160. Content delivery network 110 includes one or more content nodes (CN) 111-113. Each of CN 111-113 can include one or more data storage systems, such as that illustrated for CN 113 as data storage system 120. Data storage system 120 can be an example of content data storage 120 of FIG. 1. End user devices 130-132 are representative of a plurality of end user devices, which can request and receive network content, and any number of end user devices 130-132 can be associated with each of content nodes 111-113. CN 111-113 and ones of end users 130-132 communicate over associated network links 170-172. Content delivery network 110 and origin servers 140-141 communicate over associated network links 173-174. Content delivery network 110 and management system 160 communicate over link 175. Although not shown in FIG. 1 for clarity, each of CN 111-113 can also communicate with each other over network links.

To further illustrate FIG. 1, a brief description of the operation of communication system 100 is included. In operation, end user devices 130-132 request network content, such as content 145-146 associated with origin servers 140-141. Instead of these requests being handled by the individual origin servers 140-141, individual content nodes 111-113 of content delivery network 110 receive the content requests over ones of links 170-172 and process the content requests for delivery of the content to the associated end user devices 130-132. Requested network content that is already stored in ones of CN 111-113 can be provided quickly to the end user devices, while network content that is not already stored in ones of CN 111-113 can be responsively requested by an associated one of CN 111-113 from an appropriate origin server 140-141 for delivery by the CN and possible caching by the CN. In this manner, each of CN 111-113 can act as intermediary proxy nodes to provide local and fast access for end user devices 130-132 to network content of origin servers 140-141 without burdening origin servers 140-141. FIG. 1 shows cached content 121 included in data storage system 120 of CN 113 as comprised of content 145-146, and thus content 145-146 is currently shown as cached by CN 113. Other configurations are possible, including subsets of content 145-146 being cached in individual ones of CN 111-113.

Although FIG. 1 shows content 145-146 of origin servers 140-141 being cached by data storage system 120. CN 111-113 can handle other content. For example, dynamic content generated by activities of end user devices 130-132 need not originally reside on origin servers 140-141, and can be generated due to scripting or code included in web page content delivered by CN 111-113. This dynamic content can also be cached by ones of CN 111-113, and can be specific to a particular end user device during a communication session.

Management system 160 handles configuration changes and status information for system operators and for the origin server operators or managers. For example, administrator 151 can use management system 160 to transfer dictionary configuration (dict config) 150 to content delivery network 110. Configuration 151 may alter the handling of content requests from end user devices 130-132, may alter the content that is supplied to end user devices 130-132, or may provide any other dictionary support to a VCL configuration in content delivery network 110. Also, management system 160 can monitor status information for the operation of CN 111-113, such as operational statistics, and provide this status information to administrator 150. Although one management system is illustrated in the present example, it should be understood that any number of management systems may be employed.

As described herein, VCL files are executed by CNs to manage the handling of incoming content requests from end user devices. These VCL files may ensure that particular IP addresses are blocked, particular IP addresses are forwarded to a specific domain name, or any other similar operation with a content request. In the present example, the VCL files for a particular service may use edge dictionaries, which act as a reference or lookup key-value pairs that can be used to make determinations on a specific request. In particular, a VCL configuration or file executing on the CN may call or reference edge dictionary (edge dict) 122, which comprises a function to determine attributes associated with a content request. In particular, the VCL configuration may provide a "key," such as a country code or some other key associated with a content request, and edge dictionary 122 may return a "value" associated with the key. For example, using the country code example, edge dictionary 122 may provide a domain that is associated with the country code. Once provided, the VCL configuration may provide content for the original content request from the end user device based on the returned value.

In some implementations, administrator 151 may provide dictionary configuration 150 to configure edge dictionaries in content delivery network 110. This configuration may include a configuration to generate a new edge dictionary, a configuration to add an edge dictionary to a current VCL configuration, a configuration to modify an edge dictionary, or a configuration to delete one or more entries in an edge dictionary. Further, to generate the configurations, administrator may use an API provided by the content delivery network 110 to implement dictionary configurations via management system 160. Accordingly, instead of generating a new VCL file or configuration for each modification, the administrator may use the API to communicate modifications to the dictionary used by the VCL. Using the example in FIG. 1, when administrator 151 generates dictionary configuration 150 that is provided to content delivery network 110, management system 160 may apply the request based on the command in the API format to make changes to edge dictionary 122.

Referring back to the elements of FIG. 1, CN 111-113, origin servers 140-141, and management system 160 can each include communication interfaces, network interfaces, processing systems, computer systems, microprocessors, storage systems, storage media, or some other processing devices or software systems, and can be distributed among multiple devices. Examples of CN 111-113, origin servers 140-141, and management system 160 can each include software such as an operating system, logs, databases, utilities, drivers, caching software, networking software, and other software stored on a computer-readable medium. Content delivery network 110, in addition to including CN 111-113, can include equipment and links to route communications between CN 111-113 and any of end user devices 130-132, origin servers 140-141, and management system 160, among other operations.

End user devices 130-132 can each be a user device, subscriber equipment, customer equipment, access terminal, smartphone, personal digital assistant (PDA), computer, tablet computing device, e-book, Internet appliance, media player, game console, or some other user communication apparatus, including combinations thereof.

Communication links 170-175 each use metal, glass, optical, air, space, or some other material as the transport media. Communication links 170-175 can each use various communication protocols, such as Time Division Multiplex (TDM), asynchronous transfer mode (ATM), Internet Protocol (IP), Ethernet, synchronous optical networking (SONET), hybrid fiber-coax (HFC), circuit-switched, communication signaling, wireless communications, or some other communication format, including combinations, improvements, or variations thereof. Communication links 170-175 can each be a direct link or can include intermediate networks, systems, or devices, and can include a logical network link transported over multiple physical links. Although one main link for each of links 170-175 is shown in FIG. 1, it should be understood that links 170-175 are merely illustrative to show communication modes or access pathways. In other examples, further links can be shown, with portions of the further links shared and used for different communication sessions or different content types, among other configurations. Communication links 170-175 can each include many different signals sharing the same associated link, as represented by the associated lines in FIG. 1, comprising resource blocks, access channels, paging channels, notification channels, forward links, reverse links, user communications, communication sessions, overhead communications, carrier frequencies, other channels, timeslots, spreading codes, transportation ports, logical transportation links, network sockets, packets, or communication directions.

Figure 2:
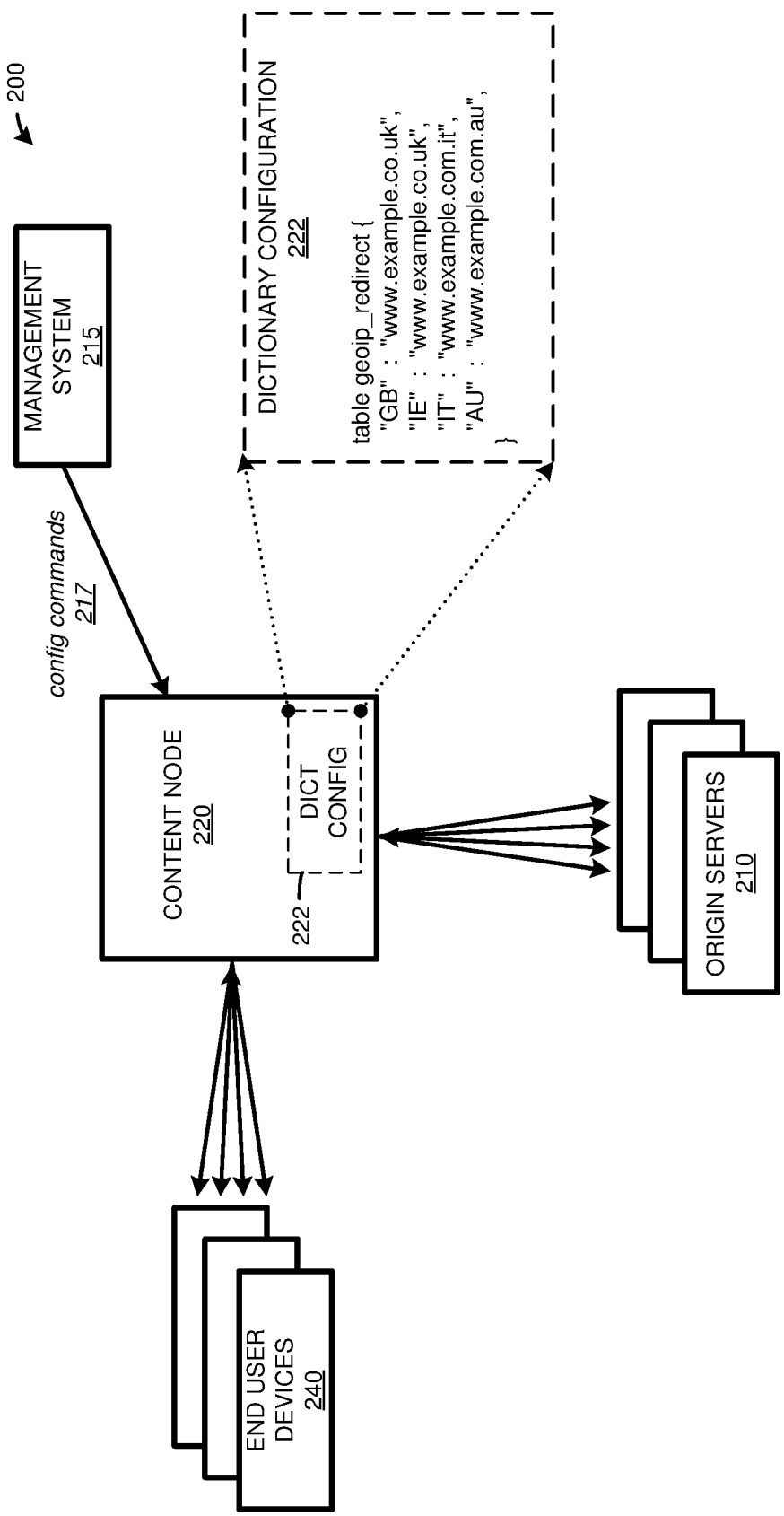
FIG. 2 illustrates an operational scenario of operating a content delivery node with an edge dictionary according to an implementation.

Referring now to FIG. 2, FIG. 2 illustrates an operational scenario 200 of operating a content delivery node with an edge dictionary according to an implementation. Operational scenario 200 includes end user devices 240, content node 220, origin servers 210, and management system 215. FIG. 2 is provided to demonstrate an example dictionary configuration 222 for a content node and a service provider.

As described in FIG. 1, content nodes, such as content node 220, provide an intermediary content cache for data between end user device 240 and origin servers 210. This limits the latency for content requests by the end user devices, and may further limit the number of requests that must be processed by the origin servers. In the present example, content node 220 is provided with dictionary configuration 222, which is used in conjunction with VCL to provide management of incoming communication requests. In particular, dictionary configuration 222 is used by VCL to direct incoming content requests by end user devices to the appropriate domain name associated with the country code. This configuration includes a "key," which is the country code associated with the IP address for the requesting user, and a "value," which is associated with the domain name for the requesting user. For example, when an end user device in end user devices 240 requests content from a service associated with "example," the country code for the IP address of the end user may be provided to dictionary configuration 222 using a VCL operating in content node 220. The country code will then be mapped to the appropriate domain, directing the content request to the appropriate webpage.

To configure the dictionary configuration for content node 220 and other content nodes in the content delivery network, an API may be used that permits administrators associated with the "example" service to add, modify, delete, or otherwise modify entries within dictionary objects. In particular, an administrator may use management system 215 to provide configuration (config) commands 217 to the content nodes in the content delivery network. This permits the administrator to write a command, such as "curl-XPOST-H 'CDNProvider-Key: <API_key>' 'https://api.CDNProvider.com/service/<service_id>/dictionary<dictionary_id>/item?item_key=NZ&item_value=wwwv.example.com.au, '" to add a new entry to the dictionary configuration. Once the command is generated, the command is applied to modify the dictionary, without requiring the administrator to increment a VCL version for the modification. Rather, the dictionary may be used by the VCL operations on the content node 220 as a lookup database to match keys to defined values. Thus, once a dictionary is linked to the VCL services of content node 220, the dictionary may be modified by an administrator without modifying or creating a new version of the VCL service, and permitting the dictionary to be modified as a standalone resource on the content node.

Figure 3:
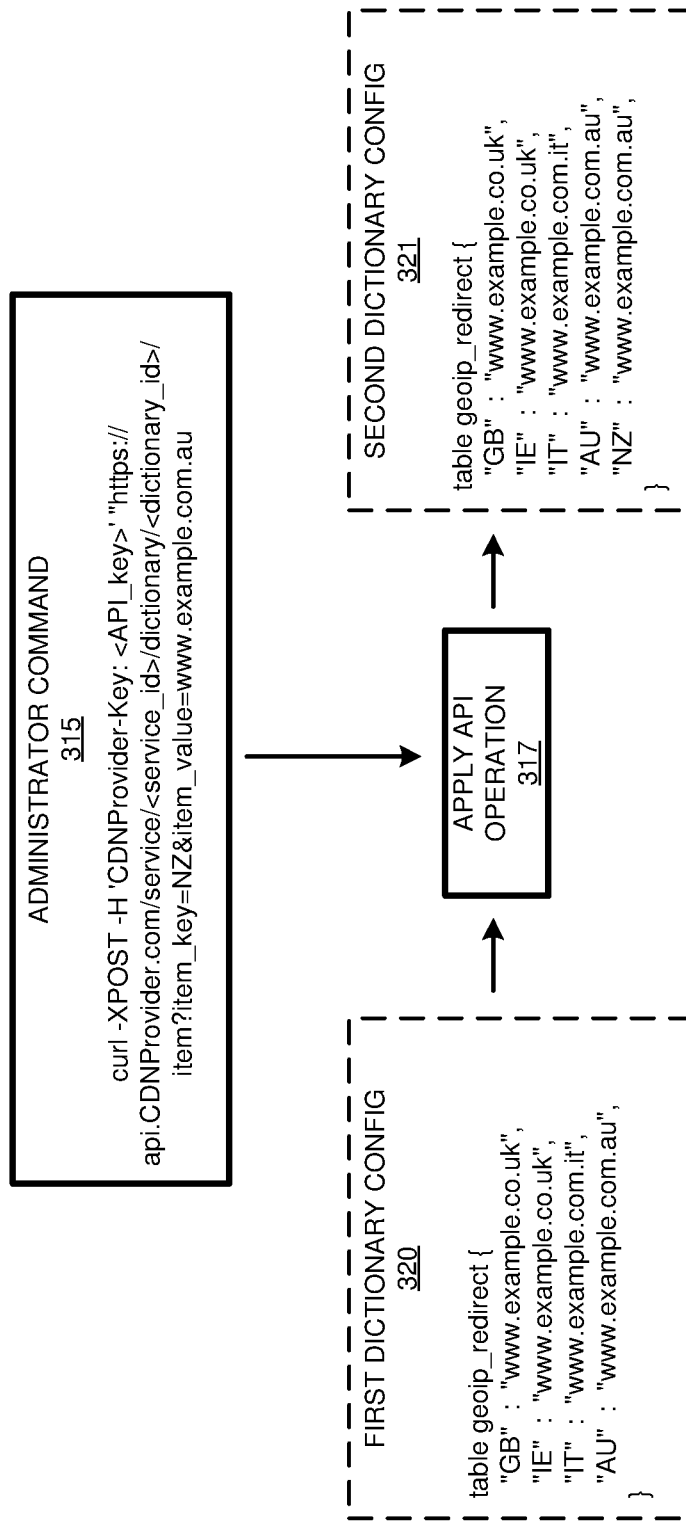
FIG. 3 illustrates an operational scenario of modifying an edge dictionary according to an implementation.

To further demonstrate the modification of a dictionary configuration, FIG. 3 is provided. FIG. 3 illustrates an operational scenario 300 of modifying an edge dictionary according to an implementation. Operational scenario 300 includes first dictionary configuration (config) 320, second dictionary configuration (config) 321, administrator command 315, and apply API operation 315. Operational scenario 300 is an example operation of a content node to update a geoIP edge dictionary, however, it should be understood that similar operations may be used to update other dictionaries.

As described herein, edge dictionaries may be implemented in content nodes of a content delivery network to more efficiently implement content request rules for requesting end user devices. These edge dictionaries may include rules for blacklisting particular IP addresses, blacklisting particular redirects from other domains, implementing geoIP redirects, or some other similar operation for a content node in a content delivery network. In the example of operational scenario 300, a first dictionary configuration 320 is provided to one or more content nodes of a network, wherein the dictionary container comprises a table for geoIP redirects. In particular, the table is configured to associate country codes for content requests into a domain associated with the organization "example." For example, if a content request were received from an IP address associated with GB, then the table may be used to provide www.example.co.uk to the requesting device.

To implement the dictionary configurations within content nodes of the network, an API may be provided to administrators associated with the "example" organization. This permits administrators to enter a dictionary command, which in turn will update a dictionary deployed for the nodes. To create an initial edge dictionary, an administrator may create an empty dictionary container in a working version of a service that's unlocked and not yet activated. Once created, the administrator may activate the new version of the service associated with the empty dictionary container, and add dictionary items to the newly created dictionary container. Once the dictionary container is generated, and linked to a service (a VCL configuration), functions within the service may be defined to call the dictionary container to provide the appropriate operation on the data. In the example of FIG. 3, to provide a domain determination to satisfy the request.

Once the dictionary is implemented for a VCL service in the content nodes, the administrator may use an API to modify the existing dictionary configuration. Here, the administrator provides administrator command 315, which includes 'curl-XPOST-H 'CDNProvider-Key: <API_key>' "https://api.CDNProvider.com/service/<service_id>/dictionary/<dictionary_id>/item?item_key=NZ&item_value=www.example.com.au'". Responsive to the command of the administrator, which may be received through a management system external from the content nodes of the network, apply API operation 317 is executed to implement the request in the dictionary data structure. This implementation includes generating a second version of the data structure, represented by second dictionary configuration 321. In the present example, the administrator requests to add a new dictionary item that includes a country identifier for New Zealand (NZ) and associates the country identifier for with the domain "www.example.com.au." Accordingly, when a request is received with a NZ identifier, the table may be used to direct the request to content associated with "www.example.com.au."

By providing the API and the edge dictionaries, the administrator of a particular organization and service may modify content request rules dynamically without implementing a new service version for each modification. Instead, the administrator may dynamically update the tables of the dictionaries, permitting a current version of the VCL service to continue to call upon the dictionary to resolve key-value requests related to the geoIP redirects, while the values within the table may change based on current preferences of the administrator. This updating of the tables limits the amount of resources that are required to recompile and deploy a new VCL configurations for minor changes desired by administrators of the content delivery network.

Although illustrated in the example of operational scenario 300 as adding a new entry to the dictionary, it should be understood that similar API operations may be used to remove or edit entries from the dictionary. Further, the API may also include operations permitting an administrator of a service to add a new dictionary or entirely remove a dictionary from the service.

While demonstrated in the examples of FIGS. 1-3 as using VCL files and configurations to provide the request handling operations, it should be understood that any request handler configuration language may be used to handle the requests from end user devices. These request handler configuration languages may include nginx (or engine x), Squid, or some other request handler and proxy configurations service.

Figure 4:
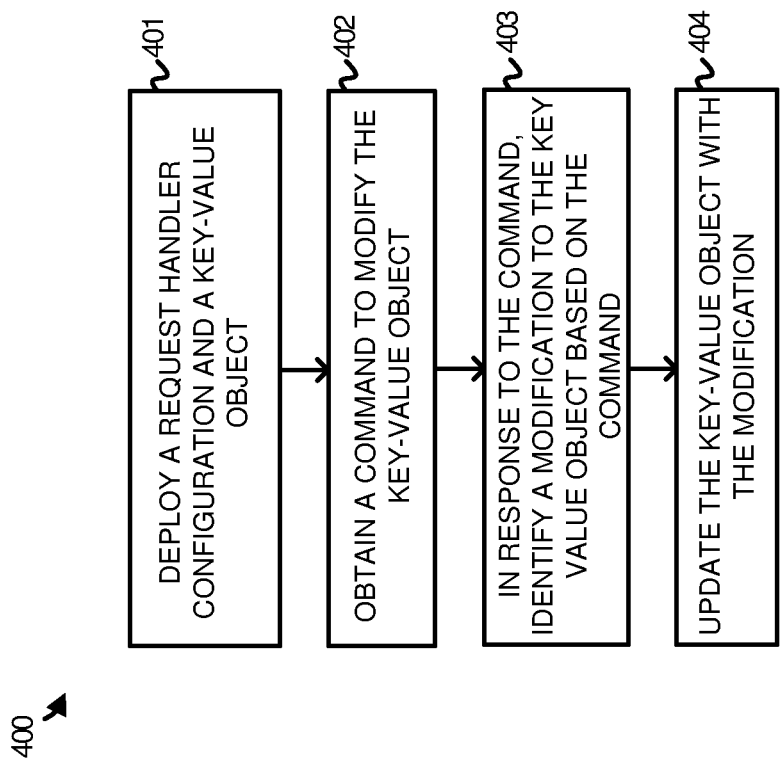
FIG. 4 illustrates a method to manage key-value objects in a content node of a content delivery network according to an implementation.

FIG. 4 illustrates a method 400 to manage key-value objects in a content node of a content delivery network according to an implementation. The operations of method 400 are referenced parenthetically in the paragraphs that follow.

As described herein, content nodes provide an intermediary content cache for data between end user devices and origin servers. To provide the caching operations, a content node may deploy (401) a request handler configuration and a key-value object, wherein the key-value object includes one or more key-value pairs and wherein the request handler configuration calls, in response to a content request from an end user device, the key-value object using a key associated with the content request and the key-value object returns a value associated with the key. In some implementations, the request handler configuration, which may comprise a VCL configuration, a Squid configuration, a nginx configuration, or some other cache configuration, may implement functions to call the key-value object that provide a key as a parameter of the function, and are returned a value that is associated with the key. For example, an IP address may be provided as a key, and a blacklist key-value object may return whether the IP address should be blocked from receiving content.

After deploying the request handler configuration and the key-value object (edge dictionary), the method further includes obtaining (402) a command to modify the key-value object. This command may be provided directly at the content node, or may be supplied from a management system that can deploy modifications to a plurality of content nodes in the content delivery network. In response to the command, the method provides for identifying (403) a modification to the key-value object based on the command, and updating (404) the key-value object with the modification. This modification may include a replacement modification to replace a key-value pair in the object, an addition modification to add a new key-value pair to the object, a removal modification to remove a key-value pair from the object, or some other similar modification to the object. In some implementations, the command may be provided in the form of an API. Once received, the API may be translated into the required changes to the key-value object, and the changes may be implemented in the object.

By providing the key-value objects, configuration changes may be more efficiently implemented within the content nodes of the content delivery network. In particular, rather than updating a request handler configuration (such as a VCL configuration) each time a modification is made, which can take time and resources, a smaller modification may be implemented within the key-value object. As a result, rather than updating the request handler configuration itself (updating the version of the configuration), the key-value lookup object may be updated limiting the changes required for the code of the request handler configuration.

Figure 5:
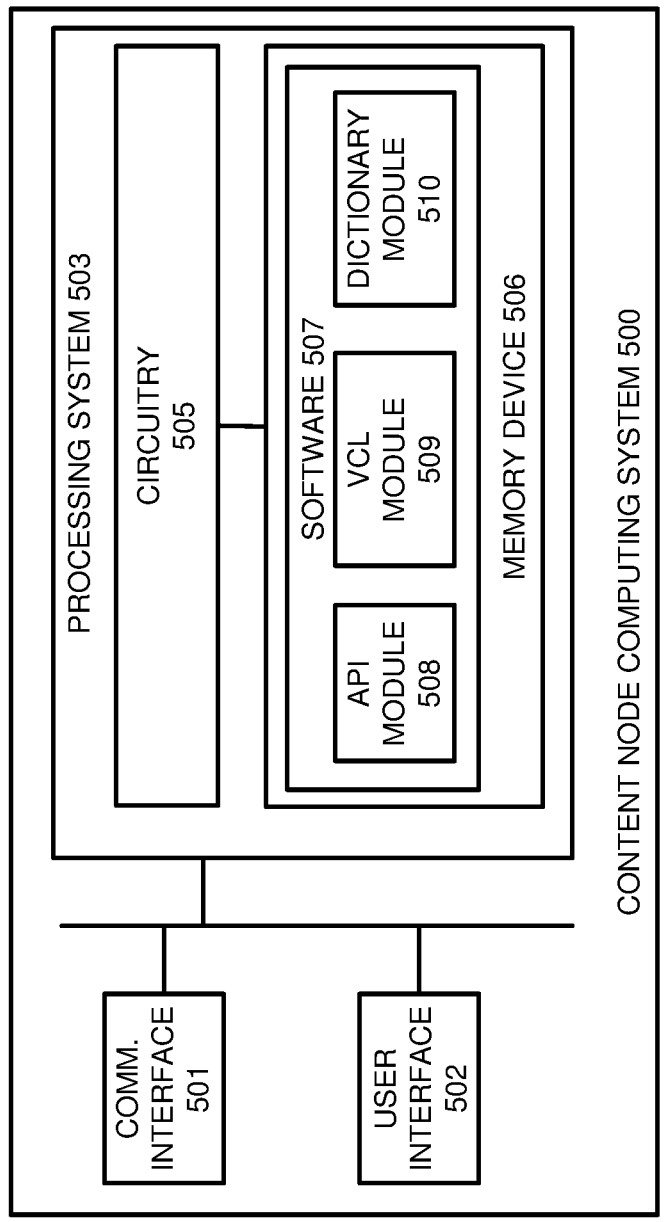
FIG. 5 illustrates a content node computing system to implement edge dictionaries in a content delivery network according to implementation.

Turning now to FIG. 5, FIG. 5 illustrates a content node computing system 500 to implement edge dictionaries in a content delivery network according to an implementation. Computing system 500 is an example of a content delivery node described in FIGS. 1-4, although other examples may exist. Computing system 500 comprises communication interface 501, user interface 502, and processing system 503. Processing system 503 is linked to communication interface 501 and user interface 502. Processing system 503 includes processing circuitry 505 and memory device 506 that stores operating software 507.

Communication interface 501 comprises components that communicate over communication links, such as network cards, ports, RF transceivers, processing circuitry and software, or some other communication devices. Communication interface 501 may be configured to communicate over metallic, wireless, or optical links. Communication interface 501 may be configured to use TDM, IP, Ethernet, optical networking, wireless protocols, communication signaling, or some other communication format—including combinations thereof.

User interface 502 comprises components that interact with a user. User interface 502 may include a keyboard, display screen, mouse, touch pad, or some other user input/output apparatus. User interface 502 may be omitted in some examples.

Processing circuitry 505 comprises microprocessor and other circuitry that retrieves and executes operating software 507 from memory device 506. Memory device 506 comprises a non-transitory storage medium, such as a disk drive, flash drive, data storage circuitry, or some other memory apparatus. Operating software 507 comprises computer programs, firmware, or some other form of machine-readable processing instructions. Operating software 507 includes API module 508, VCL module 509, and dictionary module 510, although any number of software modules may provide the same operation. Operating software 507 may further include an operating system, utilities, drivers, network interfaces, applications, or some other type of software. When executed by circuitry 505, operating software 507 directs processing system 503 to operate computing system 500 as described herein.

In at least one implementation, API module 508 directs processing system 503 to receive API commands from an administrator of a service on a content delivery network. This service often corresponds to an organization, such as a corporation, that uses the content delivery network to supply content to requesting end user devices. The service includes VCL files represented by VCL module 509 that, when executed by processing system 503, define request handling and document caching policies for content to be supplied to requesting end user devices. These policies may include blacklisting policies, content determination policies, security policies, or any other similar policy related to request handling from end user devices.

Here, in addition to VCL module 509, software 507 further includes dictionary module 510, which is representative of edge dictionaries that can be used in conjunction with the VCL files. In particular, dictionary module 510, when executed by processing system 503, directs processing system 503 to provide dictionary services as described herein. These services permit the VCL files to call the dictionary objects (key-value objects) with a "key." which is then applied by the dictionary object to determine a "value" associated with the key. For example, referring to operational scenario 300 in FIG. 3, the key supplied by the VCL services may indicate a country code, and the dictionary may be used to provide the domain name associated with the country code. Once provided, the VCL services may use the domain name to provide the required content to the end user device.

Returning to the application of API module 508, API module 508, when read and executed by processing system 503, permits an administrator to add, delete, and modify (replace) entries within the dictionary without updating the version of the VCL files. This permits the administrator to use the dictionary objects as a database for the VCL configuration files, and dynamically modify the dictionary objects without making modifications to the VCL files that makes calls to the dictionaries. This may increase efficiency, as generating new VCL versions for each of the modifications would require unnecessary time and resources to deploy the required modifications. Further, by adding, removing, or replacing key-value pairs of the dictionary, changes may be applied more quickly than otherwise waiting for a new version of the VCL to be deployed.

In at least one implementation, after a VCL configuration is deployed with associated dictionaries, API module 508 may direct processing system 503 to obtain a command to modify the deployed dictionary, wherein the command may be provided in a defined API format. In response to the command, API module 508 may identify a modification to the key-value object based on the command, and update the dictionary with the identified modification. Accordingly, once the VCL configuration and dictionaries are deployed via VCL module 409 and dictionary module 410. API module 408 may be used to update the dictionaries without modifying or generating a new VCL configuration version.

While demonstrated in the example of FIG. 4 as using VCLs to provide the request handling operations, it should be understood that other request handler configuration languages may be used. These handler configuration languages may include Squid configuration language, nginx configuration language, or some other similar language capable of making function calls to a key-value object (dictionary) resources.

To further demonstrate the operation of the edge dictionaries in a content delivery network, the following examples are provided. Edge dictionaries allow administrators to create logic that doesn't need to be attached to a configuration service version. Edge dictionaries are made up of dictionary containers (or objects) and dictionary items. Dictionary items can be used to create and store key-value pairs. Attaching dictionary containers to a service version allows frequently repeated statements to be turned into single function statements that act as a constant.

To create an edge dictionary and use it within a service, the following steps may be used:

1. Create an empty dictionary container in a working version of a service (VCL configuration) that's unlocked and not yet activated.

2. Activate the new version of the service associated with the empty dictionary container.

3. Add dictionary items to the newly created dictionary container.

Once the dictionary container is created, properly associated, and filled with dictionary items, it can be called by the service.

For example, if a service included a reference blacklist that changes frequently, a dictionary object may be used to provide the operations of the blacklist. Any time that service's configuration changes, especially if the configuration rolls back to a previous version, the administrator may want the blacklisted reference domains to continue to remain with the service configuration instead of being removed. Dictionary objects would help in providing this functionality.

I. Create an Empty Dictionary Container within a Service

In order to use a dictionary container, an empty container is created, wherein the container is associated with an unlocked version of a service. Before an edge dictionary can be manipulated, its dictionary container must be associated with at least one service (VCL configuration) version that is not locked and not active so that the service becomes aware of the dictionary's existence. For example, when creating a reference blacklist via the API, an API call may be made by running a command similar to the following:

```
curl -XPOST -H 'Fastly-Key: <API_key>'
https://api.fastly.com/service/<service_id>/version/<version_number>/dictionary?name=refe
rer_blacklist
``` which would return:

```
{
"name":"referer_blacklist",
"service_id":"<service_id>",
"version":<version_number>,
"id":"<dictionary_id>"
}
```

II. Activate the Service Associated with the Dictionary Container

In order for an edge dictionary to appear available in generated VCL so it can be referred to later, the version associated with the dictionary container must be activated. Using the reference blacklist example, the administrator would make this API call to activate service version associated with the empty dictionary container that was created:

```
curl -XPUT -H 'Fastly-Key: <API_key>'
https://api.fastly.com/service/<service_id>/version/<version_number>/activate
```

The response would be this:

```
{"number":<version_number>,
"active":true,
"service_id":"<service_id>"}
```

III. Add Dictionary Items

Once the dictionary container becomes associated with the configuration of a service, the administrator can begin populating it with dictionary items. For example, the administrator may use commands similar to the following API call for each URL that are to be added to the reference blacklist:

```
curl -XPOST -H 'Fastly-Key: <API_key>'
"https://api.fastly.com/service/<service_id>/dictionary/<dictionary_id>/item?item_key=example-referer.org&item_value=true"
```

The response for each URL added would look similar to this:

```
{
"dictionary_id":"<dictionary_id>",
"service_id":"<service_id>",
"item_key":"example-referer.org",
"item_value":"true"
}
```

Once the blacklisted URLs are added as items in the dictionary container, the administrator can find them in the associated VCL by looking for a table similar to this:

```
table referer_blacklist {
"example-referer.org":"true",
"another-referer.net":"true",
"sample-referer.com":"true",
}
```

IV. Using a Service to Call Edge Dictionaries

When dictionaries are created via API calls, the dictionary contents aren't tied to any single version of the service. The logic needed to interact with the table of information the edge dictionary creates, however, is always tied to a service version. For example, adding a new reference to the blacklist requires that VCL service interact with the Edge Dictionary at some point after it is created. This interaction can be provided via API calls because it's data would not require a service version. The dictionary was created via API calls not via custom VCL.

Specifically, the administrator may set the host of the reference to a header by including custom VCL like this:

```
// versioned vcl
sub vcl_recv {
  # capture host of referer into a header
  set req.http.Referer-Host = regsub(req.http.Referer,
```

-continued

```
  "^https?://?([^:/\s]+).*$");
  # check if referrer host is in blacklisted table
  if( table.lookup(referer_blacklist, req.http.Referer-Host) ) {
    # ResponseObject: forbidden-referrer
    error 900 "Internal Error";
  }
  #end condition
sub vcl_error {
  if (obj.status == 900 ) {
    set obj.http.Content-Type = "";
```

-continued

```
    synthetic {""};
    return(deliver);
  }
}
```

V. Creating and Manipulating Dictionary Items

A dictionary item is a key-value pair that makes up an entry in a dictionary container in an edge dictionary. Once an administrator creates an Edge Dictionary and associates the dictionary container with a service, any dictionary items created will appear in the associated VCL.

For example, if an administrator were using Edge Dictionaries to control geoIP redirects, the table would appear similar to this:

```
table geoip_redirect {
  "GB" : "www.example.co.uk",
  "IE" : "www.example.co.uk",
  "IT" : "www.example.com.it",
  "AU" : "www.example.com.au",
}
```

If the administrator already has a dictionary container associated with an active version of a service, the administrator can easily add, update, or delete the items in it as long as dictionary_id is known.

In the geoIP example, the administrator would find the dictionary_id using the following API call

```
curl -H 'Fastly-Key:
<API_key>'https://api.fastly.com/service/<service_id>/version/<version_number>/dictionary
/geoip_redirect
``` which would return this response:

```
{
    "version":<version_number>,
    "name":"geoip_redirect",
    "id":"<dictionary_id>",
    "service_id":"<service_id>"
}
```

VI. Adding New Items to Dictionary

The administrator can add new dictionary items without having to increment the service version number. For example, this API may be used to call a geoIP table to add a new dictionary item:

```
curl -XPOST -H 'Fastly-Key: <API_key>'
"https://api.fastly.com/service/<service_id>/dictionary/<dictionary_id>/item?item_key=NZ&
item_value=www.example.com.au"
``` returns this response:

```
{
    "dictionary_id":"<dictionary_id>",
    "service_id":"<service_id>",
    "item_key":"NZ",
    "item_value":"www.example.com.au"
}
```

The table in the generated VCL would then be updated with the new dictionary item and look like this:

```
table geoip_redirect {
    "GB" : "www.example.co.uk",
    "IE" : "www.example.co.uk",
    "IT" : "www.example.com.it",
    "AU" : "www.example.com.au",
    "NZ" : "www.example.com.au",
}
```

VII. Updating a Dictionary Item

The administrator can also update any dictionary item without having to increment the service version number. For example, the following API call to the geoIP table may be used to update an existing dictionary item:

```
curl -XPUT -H 'Fastly-Key: <API_key>'
"https://api.fastly.com/service/<service_id>/dictionary/<dictionary_id>/item/NZ?item_value
=www.example.co.uk"
``` returns this response:

```
{
    "dictionary_id":"<dictionary_id>",
    "item_key":"NZ",
    "item_value":"www.example.co.uk",
    "service_id":"<service_id>"
}
```

The table in the generated VCL would then be updated with the new dictionary item and look like this:

```
table geoip_redirect {
    "GB" : "www.example.co.uk",
    "IE" : "www.example.co.uk",
    "IT" : "www.example.com.it",
    "AU" : "www.example.com.au",
    "NZ" : "www.example.co.uk",
}
```

VIII Deleting a Dictionary Item

To remove an item from the table, the following API call or some other similar call may be made:

```
curl -XDELETE -H 'Fastly-Key: <API_key>'
https://api.fastly.com/service/<service_id>/dictionary/<dictionary_id>/item/NZ
```

Unlike creation and update of dictionary items, the API call returns no response.

Although described in the previous examples using VCL, it should be understood that other similar request handler configuration languages may be used in providing a service. Further, while demonstrated as using a single key-value object per service, it should be understood that any number of key-value objects may be used by a service. For example, a first object or dictionary may be used to provide blacklisting operations, while a second dictionary may be used to provide geographic redirects.

The functional block diagrams, operational sequences, and flow diagrams provided in the Figures are representative of exemplary architectures, environments, and methodologies for performing novel aspects of the disclosure. While, for purposes of simplicity of explanation, the methodologies included herein can be in the form of a functional diagram, operational sequence, or flow diagram, and can be described as a series of acts, it is to be understood and appreciated that the methodologies are not limited by the order of acts, as some acts can, in accordance therewith, occur in a different order and/or concurrently with other acts from that shown and described herein. For example, those skilled in the art will understand and appreciate that a methodology can alternatively be represented as a series of interrelated states or events, such as in a state diagram. Moreover, not all acts illustrated in a methodology can be required for a novel implementation.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above.

What is claimed is:

1. A method of managing key-value objects in a content node of a content delivery network, the method comprising:
   utilizing a request handler configuration language to deploy a request handler configuration and a key-value object, wherein the key-value object includes one or more key-value pairs and wherein the request handler configuration calls, in response to a content request from an end user device, the key-value object using a key associated with the content request and the key-value object returns a value associated with the key;
   obtaining a command to modify the key-value object;
   in response to the command, identifying a modification to the key-value object based on the command; and
   updating the key-value object with the modification without updating the request handler configuration.

2. The method of claim 1, wherein the request handler configuration comprises a Varnish configuration language (VCL) configuration.

3. The method of claim 1, wherein the modification to the key-value object comprises a replacement modification to replace a key-value pair in the one or more key-value pairs with a second key-value pair.

4. The method of claim 1, wherein the modification to the key-value object comprises an addition modification to add a key-value pair to the one or more key-value pairs.

5. The method of claim 1, wherein the modification to the key-value object comprises a removal modification to remove a key-value pair from the one or more key-value pairs.

6. The method of claim 1, wherein obtaining the command to modify the key-value object comprises receiving, from a management system, the command to modify the key-value object.

7. The method of claim 6, wherein the command to modify the key-value object comprises an application program interface (API) command to modify the key-value object.

8. The method of claim 1, wherein the one or more key-value pairs comprise one or more country code to domain pairs.

9. A content node comprising:
   one or more non-transitory computer readable storage media;
   a processing system communicatively coupled to the one or more non-transitory computer readable storage media;
   processing instructions stored on the one or more non-transitory computer readable storage media that manage key-value objects for the content node that, when read and executed by the processing system, direct the processing system to:
      utilize a request handler configuration language to deploy a request handler configuration and a key-value object, wherein the key-value object includes one or more key-value pairs and wherein the request handler configuration calls, in response to a content request from an end user device, the key-value object using a key associated with the content request and the key-value object returns a value associated with the key;
      obtain a command to modify the key-value object;
      in response to the command, identify a modification to the key-value object based on the command; and
      update the key-value object with the modification without updating the request handler configuration.

10. The content node of claim 9, wherein the request handler configuration comprises a Varnish configuration language (VCL) configuration.

11. The content node of claim 9, wherein the modification to the key-value object comprises a replacement modification to replace a key-value pair in the one or more key-value pairs with a second key-value pair.

12. The content node of claim 9, wherein the modification to the key-value object comprises an addition modification to add a key-value pair to the one or more key-value pairs.

13. The content node of claim 9, wherein the modification to the key-value object comprises a removal modification to remove a key-value pair from the one or more key-value pairs.

14. The content node of claim 9, wherein the processing instructions to obtain the command to modify the key-value object direct the processing system to receive from a management system, the command to modify the key-value object.

15. The content node of claim 14, wherein the command to modify the key-value object comprises an application program interface (API) command to modify the key-value object.

16. The content node of claim 9, wherein the one or more key-value pairs comprise one or more country code to domain pairs.

17. An apparatus comprising:
one or more non-transitory computer readable storage media;
processing instructions stored on the one or more non-transitory computer readable storage media that manage key-value objects for the content node that, when read and executed by a processing system, direct the processing system to:
utilize a request handler configuration language to deploy a request handler configuration and a key-value object, wherein the key-value object includes one or more key-value pairs and wherein the request handler configuration calls, in response to a content request from an end user device, the key-value object using a key associated with the content request and the key-value object returns a value associated with the key;
obtain a command to modify the key-value object;
in response to the command, identify a modification to the key-value object based on the command; and
update the key-value object with the modification without updating the request handler configuration.

18. The apparatus of claim 17, wherein the modification to the key-value object comprises a replacement modification to replace a key-value pair in the one or more key-value pairs with a second key-value pair.

19. The apparatus of claim 17, wherein the modification to the key-value object comprises an addition modification to add a key-value pair to the one or more key-value pairs.

20. The apparatus of claim 17, wherein the modification to the key-value object comprises a removal modification to remove a key-value pair from the one or more key-value pairs.

* * * * *